United States Patent
Zheng

(10) Patent No.: US 12,247,743 B2
(45) Date of Patent: Mar. 11, 2025

(54) PELLET STOVE

(71) Applicant: Shenzhen Asmoke Technology Co., Ltd., Guangdong (CN)

(72) Inventor: Ying Zheng, Jiaxing (CN)

(73) Assignee: Shenzhen Asmoke Technology Co., Ltd., Guangdong (CN)

( * ) Notice: Subject to any disclaimer, the term of this patent is extended or adjusted under 35 U.S.C. 154(b) by 675 days.

(21) Appl. No.: 17/647,272

(22) Filed: Jan. 6, 2022

(65) Prior Publication Data
US 2022/0214044 A1    Jul. 7, 2022

(30) Foreign Application Priority Data
Jan. 7, 2021    (CN) .......................... 202110016693.3

(51) Int. Cl.
*F24B 1/02*    (2006.01)
*F23B 50/12*   (2006.01)
*F24B 13/00*   (2006.01)

(52) U.S. Cl.
CPC .............. *F24B 1/024* (2013.01); *F23B 50/12* (2013.01); *F24B 13/006* (2013.01)

(58) Field of Classification Search
None
See application file for complete search history.

(56) References Cited

U.S. PATENT DOCUMENTS

| | | | | |
|---|---|---|---|---|
| 4,201,185 A | * | 5/1980 | Black | F24B 7/025 126/110 E |
| 4,385,620 A | * | 5/1983 | Black | F24B 5/026 126/65 |
| 4,842,190 A | * | 6/1989 | Orchard | F24H 15/486 236/11 |
| 4,941,414 A | * | 7/1990 | Carlson | F23K 3/00 110/108 |
| 5,137,010 A | * | 8/1992 | Whitfield | F23B 50/12 110/170 |
| 5,263,642 A | * | 11/1993 | Orchard | F23N 5/022 110/190 |
| 5,285,738 A | * | 2/1994 | Cullen | F24B 7/025 110/297 |
| 5,383,446 A | * | 1/1995 | Whitfield | F23H 15/00 126/173 |

(Continued)

FOREIGN PATENT DOCUMENTS

| | | | |
|---|---|---|---|
| CN | 201944828 U | 8/2011 | |
| CN | 202166066 U | 3/2012 | |

(Continued)

*Primary Examiner* — David J Laux
(74) *Attorney, Agent, or Firm* — Osha Bergman Watanabe & Burton LLP

(57) ABSTRACT

A pellet stove includes: a furnace; a burner disposed in the furnace, a top of the burner being open; and a feed opening provided at a first sidewall of the burner. A through port for air intake and ash falling is provided at an underside of the burner. A grate supporting pellet fuel is provided above the through port. Auxiliary supports for sustaining bottom fire are disposed under the grate. The auxiliary supports are arranged higher than the through port, and the auxiliary supports are located at a side below the feed opening and cover an area not exceeding ½ of the area covered by the grate.

10 Claims, 4 Drawing Sheets

(56) References Cited

U.S. PATENT DOCUMENTS

| | | | | |
|---|---|---|---|---|
| 5,873,356 | A * | 2/1999 | Vossler | F23N 1/062 110/211 |
| 2008/0092790 | A1* | 4/2008 | Nelson | F23B 1/16 110/110 |
| 2010/0058960 | A1* | 3/2010 | Raley | F23B 50/12 110/317 |
| 2010/0126491 | A1* | 5/2010 | Swanson | F23H 15/00 126/181 |
| 2014/0116411 | A1* | 5/2014 | Jewett | F24B 13/04 126/168 |
| 2014/0318524 | A1* | 10/2014 | Measom | A47J 37/0704 126/25 R |
| 2015/0122241 | A1* | 5/2015 | Grant | F24B 5/023 110/170 |
| 2015/0316268 | A1* | 11/2015 | Mackle | F23H 15/00 110/165 R |
| 2020/0237145 | A1* | 7/2020 | Donnelly | G05B 23/0262 |
| 2022/0214040 | A1* | 7/2022 | Zheng | F23B 40/00 |

FOREIGN PATENT DOCUMENTS

| | | |
|---|---|---|
| CN | 108343947 A | 7/2018 |
| CN | 112856387 A | 5/2021 |
| CN | 112856389 A | 5/2021 |
| CN | 112856390 A | 5/2021 |

\* cited by examiner

PELLET STOVE

FIELD

Embodiments of the present disclosure relate to the field of combustion apparatuses, and more particularly relate to a pellet stove.

BACKGROUND

For conventional pellet stoves, e.g., barbecue stoves, a burner adopted basically has an enclosed bottom structure. Such a structure is very inconvenient to cleanse because after each use, the burnt pellet fuel ash has to be cleaned with a suction cleaner, rendering a poor user experience. Consider a heating stove as another example, which is generally configured with a layer of grate for holding fallen ash. However, as biomass pellet fuel usually has an extruded cylindrical structure with a diameter of about 6 mm and a length ranging from 2 cm to 6 cm, and without an external force applied, the burnt pellet fuel ash would still maintain the original cylindrical shape, the ash hardly collapses down autonomously, rendering a poor ash falling efficiency and effect. After the combustion has lasted for a relatively long time, additional means is needed to break the ash loose so as to facilitate clearing the ash. Such additional means leads to a complex structure and increases the manufacturing cost. Furthermore, conventional pellet stoves need user involvement, inconvenient to use. Additionally, the burner of conventional pellet stoves likely experiences the following conditions: feed opening backfire in cases of high burn; and extinction due to hardly sustaining the bottom fire in cases of low burn.

SUMMARY

The present disclosure provides a pellet stove, with which feed opening backfire is unlikely to occur in cases of high burn and extinction is unlikely to occur in cases of low burn.

Embodiments of the present disclosure provide: a pellet stove, comprising: a furnace; a burner disposed in the furnace, the top of the burner being open; a feed opening provided at a first sidewall of the burner, wherein a through port for air intake and ash falling is disposed at an underside of the burner, wherein a grate supporting pellet fuel is provided above the through port, wherein auxiliary supports for sustaining bottom fire are disposed under the grate, and wherein the auxiliary supports are arranged higher than the through port, and the auxiliary supports are located at a side below the feed opening and cover an area not exceeding ½ of the area covered by the grate.

Furthermore, the burner comprises a second sidewall and a third sidewall which are respectively disposed at two sides of the first sidewall, wherein the second sidewall and the third sidewall are extended into a splayed configuration towards two sides along a feed direction of the feed opening, and wherein the auxiliary supports are connected with respective bottoms of the second sidewall and the third sidewall.

Furthermore, a mounting rack for mounting the burner is provided in the furnace, the burner further comprises a fourth sidewall connected with the second sidewall, a fifth sidewall connected with the third sidewall, and a sixth sidewall connected with the fourth sidewall and the fifth sidewall, and wherein each of the fourth sidewall, the fifth sidewall, and the sixth sidewall faces and is parallel to a corresponding sidewall of the mounting rack.

Furthermore, the grate comprises a first tier of supports and a second tier of supports, the first tier of supports and the second tier of supports being secured to the burner, wherein the supports in the first tier are disposed lower than the adjacent supports in the second tier, the second tier of supports is staggered with the first tier of supports in the vertical direction, a first passage for ash falling and air intake is provided between the first tier of supports and the second tier of supports, and wherein a width of the first passage is smaller than a diameter D of the pellet fuel, and a spacing L2 between two adjacent supports in the second tier is greater than D but smaller than 2D.

Furthermore, the first tier of supports and the second tier of supports extend in a direction parallel to a feed direction of the feeding port.

Furthermore, the burner comprises an open bottom that forms the through port.

Furthermore, the auxiliary supports are of a bar structure, a net structure, or a perforated plate-like structure.

Furthermore, the auxiliary supports are removably coupled to the burner.

Furthermore, the pellet comprises an ash tray that is provided under the burner and facing the through port.

Furthermore, the pellet comprises a water storage pan, and the ash tray is disposed in the water storage pan, the ash tray is disposed above the water storage pan, or the water storage pan is provided side by side with the ash tray.

The above technical solution offers the following advantages: ash falling via the through port avoids the burnt pellet fuel ash from being accumulated at the bottom of the burner. Without substantially affecting ash falling effect of the grate, the addition of auxiliary supports offers two functions: on one hand, in cases of high burn, the ash falling efficiency and air intake amount of a position below the feeding port may be reduced so as to effectively control combustion efficiency of the pellet fuel at that position, thereby effectively avoiding occurrence of backfire; and on the other hand, in cases of low burn, due to decrease of the ash falling efficiency and air intake amount, the bottom fire is easily sustained from extinction.

BRIEF DESCRIPTION OF THE SEVERAL VIEWS OF THE DRAWINGS

Hereinafter, the present disclosure will be further illustrated with reference to the accompanying drawings.

DETAILED DESCRIPTION

First Embodiment

Figure 1:
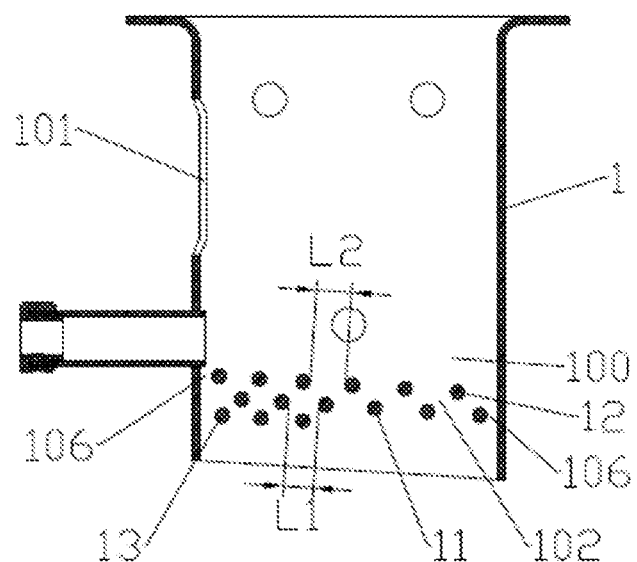
FIG. 1 shows a schematic diagram of a burner according to the first embodiment of the present disclosure.
Figure 2:
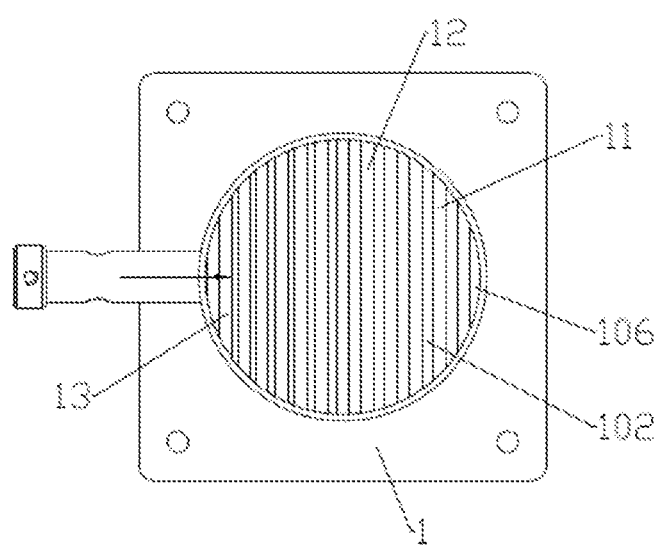
FIG. 2 shows a bottom view of the burner according to the first embodiment of the present disclosure.
Figure 3:
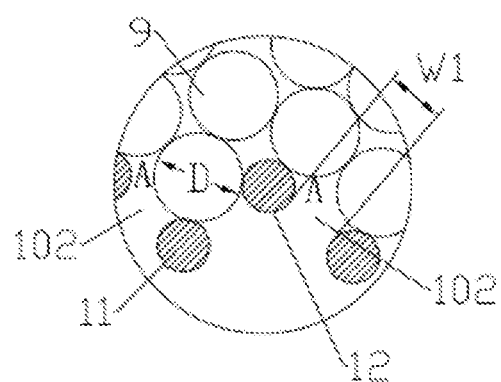
FIG. 3 is an enlarged view of the pellet fuel placed on the grate according to the first embodiment of the present disclosure.

A pellet stove is provided, comprising: a furnace; a burner 1 disposed in the furnace; as shown in FIGS. 1-3, the top of the burner 1 is open; a feed opening 101 is provided at a sidewall of the burner 1, a through port for air intake and ash falling is disposed at the underside of the burner 1, a grate supporting pellet fuel 9 is provided above the through port, auxiliary supports 13 are provided under the grate, the auxiliary supports being disposed higher than the through port, and the auxiliary supports 13 are located at a side below the feed opening 101 and cover an area not exceeding ½ of the area covered by the grate. The ½ here is only an approximate number, and any value not affecting normal ash falling and air intake is allowed. Ash falling via the through port avoids the ash of burnt pellet fuel 9 from being accumulated at the bottom of the burner 1. Without substantially affecting ash falling effect of the grate, the addition of auxiliary supports 13 offers two functions: on one hand, in cases of high burn, the ash falling efficiency and air intake amount at a position below the feeding port 101 may be reduced so as to effectively control combustion efficiency of the pellet fuel at that position, thereby effectively avoiding occurrence of backfire; and on the other hand, in cases of low burn, due to decrease of the ash falling efficiency and air intake amount, the bottom fire is easily sustained from extinction. To guarantee ash falling efficiency and effect, the through port should not be too small; in this embodiment, the bottom of the burner is directly designed to be open to form the through port, thereby achieving a good ash falling efficiency and effect.

In this embodiment, the grate includes a first tier of supports 11 and a second tier of supports 12, the first tier of supports 11 and the second tier of supports 12 being secured to the burner 1, wherein supports 11 in the first tier are disposed lower than adjacent supports 12 in the second tier, the second tier of supports 12 are arranged stagger with the first tier of supports 11 in the vertical direction, first passages 102 for ash falling and air intake are provided between the first tier of supports 11 and the second tier of supports 12, width W1 of the first passage 102 being smaller than diameter D of the pellet fuel 9, and spacing L2 between two adjacent supports 12 in the second tier is greater than D but smaller than 2D. As the width of the first passage 102 is smaller than the diameter D of the pellet fuel 9 and the spacing L2 between two adjacent supports 12 in the second tier is greater than D but smaller than 2D, the pellet fuel 9 surely enters between two adjacent supports 12 in the second tier, instead of directly falling off from the first passage 102; moreover, as the pellet fuel 9 first entering between two adjacent supports 12 in the second tier surely holds the pellet fuel 9 above aerially, as shown in area A in FIG. 3, it is impossible for two pieces of pellet fuel 9 to enter abreast between two adjacent supports 12 in the second tier, which increases contact area between the pellet fuel 9 and air, thereby effectively enhancing combustion efficiency. Experiments measured that 25% fuel could be saved. Furthermore, because the pellet fuel 9 is burnt from bottom to top, the pellet fuel 9 between adjacent two supports 12 in the second tier is first burnt to ash; therefore, to enhance ash falling efficiency: first, by proving the feed opening 101 at a sidewall of the burner 1, pellet fuel, when being fed into the combustion chamber, rolls downwards due to gravity and strikes against the pellet fuel under the feeding port; furthermore, because it is impossible for two pieces of pellet fuel to enter abreast between two adjacent supports in the second tier, the acting force generated when the pellet fuel is fed into the combustion chamber is surely transmitted to the burnt pellet fuel ash between two adjacent supports in the second tier to break the ash loose; second, because the first passage 102 also serves to inlet air, the air flowing upwards through the first tier of supports 11 and the second tier of supports 12 disperses the ash resulting from the burnt pellet fuel 9; and once the ash is dispersed, the pellet fuel 9 above drops, such that there is no space to maintain the ash at the current position and the ash falls off from the first passage 102. In view that the ash and the air move in opposite directions where the ash falls downwards while the air flows upwards, to avoid mutual interference, the second tier of supports 12 are arranged stagger with the first tier of supports 11 in the vertical direction, i.e., the second tier of supports 12 and the first tier of supports 11 do not completely overlap in the vertical direction; the first passage 102 so formed is cant. Air passing through two opposite first passages 102 blows in opposite directions to disperse the ash; in addition to the impedance by the pellet fuel 9 above, the airflow does not suffice to provide a lift force enabling the ash to overcome the gravity from falling down, and in further addition to the pallet fuel falling from above which squeezes the space where the ash was previously occupied, the ash continuously falls off, so on and so forth, thereby realizing automatic, efficient ash falling for the pellet fuel 9 in the burner, and yielding a good ash falling effect. As the efficient ash falling is achieved by cooperation between feed and air intake, no additional means is needed to facilitate ash clearing; as such, not only the manufacturing cost is reduced, user involvement is also eliminated, thereby remarkably improving user experience.

In this embodiment, the first tier of supports 11 and the second tier of supports 12 are bars and arranged in parallel. The bars may select typical round bars or square bars. In addition to the straight bars selected in this embodiment, curved bars may also be selected. The first tier of supports 11 and the second tier of supports 12 may be secured to the burner 1 by directly welding or by other typical manners. Alternatively, the first tier of supports 11 and the second tier of supports 12 may be first secured to a transition sleeve, and then the transition sleeve is secured to the burner 1. Furthermore, as the first tier of supports 11 and the second tier of supports 12 are bars, spacings 106 surely exist between the first and second tiers of supports 11, 12 and the inner sidewall of the burner 1, wherein the width of the spacing 106 is also arranged in a manner of allowing the pellet fuel to directly pass through, i.e., less than D.

In this embodiment, the auxiliary supports 13 adopt a bar structure, such that certain spacings are also existent between adjacent auxiliary supports 13 so as to inlet air, which facilitates combustion promotion to sustain the bottom fire. In practical applications, the auxiliary supports 13 may also be of a net structure or a perforated plate-like structure; without considering the impacts on air intake and ash falling, even a non-perforated flat plate can be adopted. The auxiliary supports 13 may also be arranged in a freely removable manner, i.e., mounted in the burner 1 when needed, and removed when not needed.

In this embodiment, the auxiliary supports 13 are arranged parallel to the first tier of supports 11 and the second tier of supports 12; alternatively, the auxiliary supports 13 may be arranged crossed with the first tier of supports 11 and the second tier of supports 12.

The parallel and crossed mentioned in this embodiment refer to relationships between projections of corresponding structures on the same plane.

Second Embodiment

Figure 4:
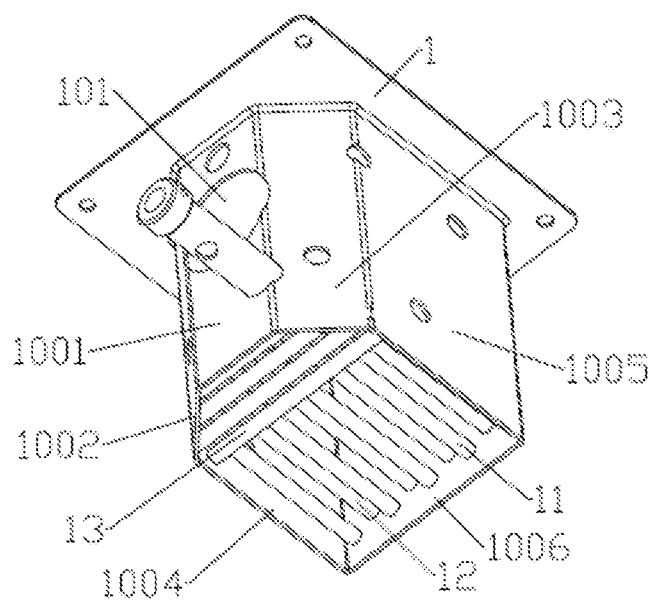
FIG. 4 is a schematic diagram of a burner according to a second embodiment of the present disclosure.

Besides the cylindrical shape, the burner 1 may also be designed as a hollow prismatic shape, as shown in FIGS. 4 and 5. Specifically, the burner 1 comprises a first sidewall 1001 where a feed opening 101 is provided, a second sidewall 1002 and a third sidewall 1003 which are respectively disposed at two sides of the first sidewall 1001, wherein the second sidewall 1002 and the third sidewall 1003 are extended into a splayed configuration towards two sides along the feed direction of the feed opening, and the auxiliary supports 13 are connected with respective bottoms of the second sidewall 1002 and the third sidewall 1003. The splayed configuration formed by the second sidewall 102 and the third sidewall 1003 may prevent the pellet fuel from building up under the feed opening 101, which also facilitates prevention of backfire at the feed opening 101.

In this embodiment, the first tier of supports 11 and the second tier of supports 12 are parallel to the feed direction of the feed opening 101, while the auxiliary supports 13 are vertical to the first tier of supports 11 and the second tier of supports 12. The parallel and vertical mentioned in this embodiment refer to relationships between projections of corresponding structures on the same plane.

In this embodiment, the first tier of supports 11 and the second tier of supports 12 are parallel to the feed direction of the feed opening 101; to effectively utilize the spacings between the sidewalls of the burner 1 and the first and second tiers of supports 11, 12, the burner 1 further comprises a fourth sidewall 1004 connected with the second sidewall 1002, a fifth sidewall 1005 connected with the third sidewall 1003, and a sixth sidewall 1006 connected with the fourth sidewall 1004 and the fifth sidewall 1005, respectively; wherein the fourth sidewall 1004 and the fifth sidewall 1005 are parallel to the first tier of supports 11 and the second tier of supports 12; the spacings between the fourth and fifth sidewalls 1004, 1005 and the first and second tiers of supports 11, 12 have a uniform width size to facilitate air intake and ash falling, while the sixth sidewall 1006 is vertical to the feed direction of the feed opening, such that after the pellet fuel strikes against the sixth sidewall 1006, it is more easily rebounded to fall between adjacent supports 12 in the second tier.

Third Embodiment

Figure 5:
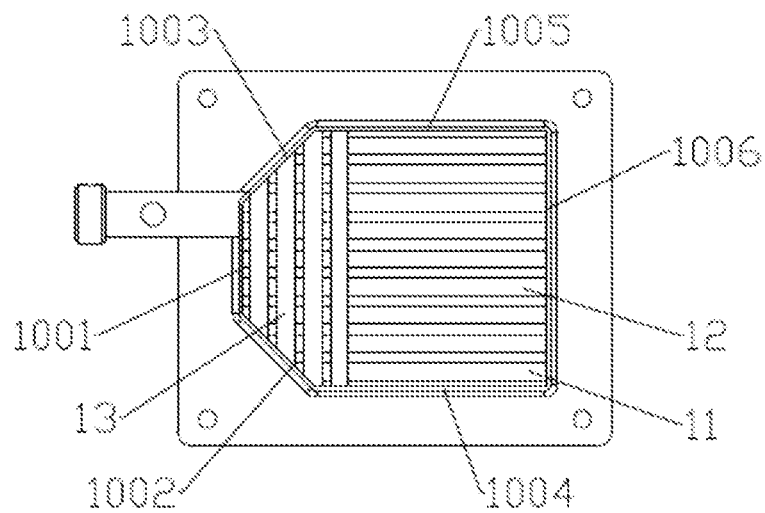
FIG. 5 is a bottom view of the burner according to the second embodiment of the present disclosure.
Figure 6:
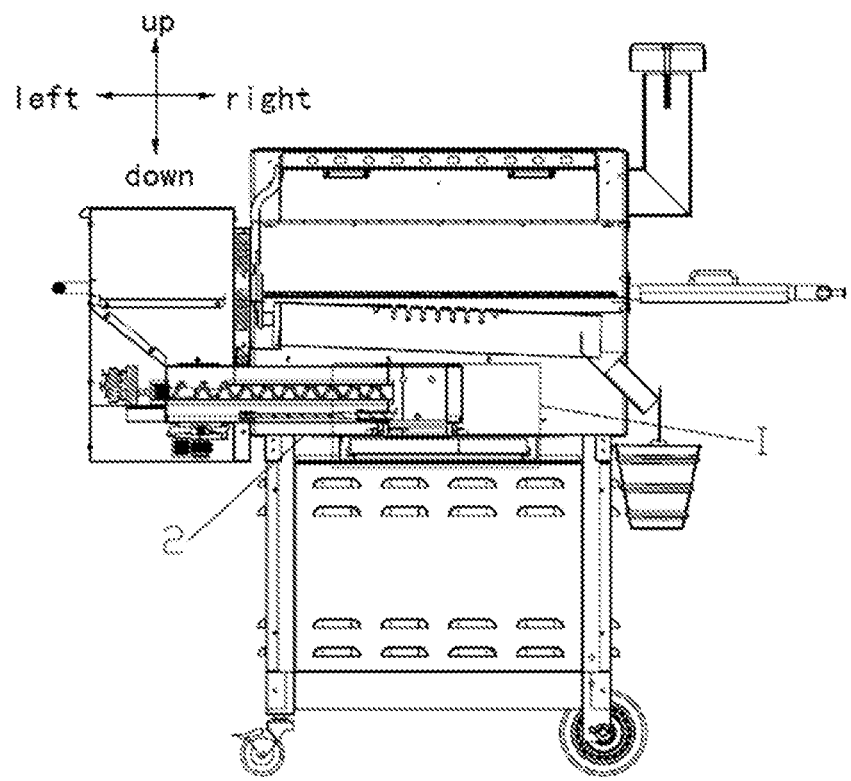
FIG. 6 is a schematic diagram of a pellet stove according to a third embodiment of the present disclosure.
Figure 7:
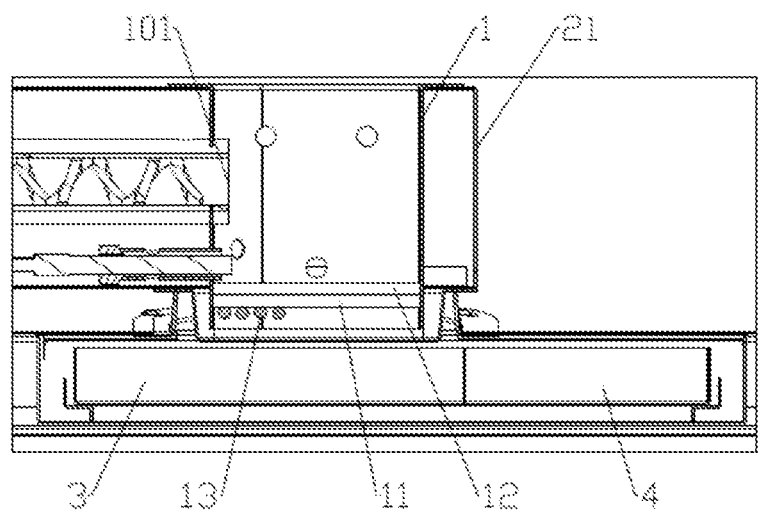
FIG. 7 is an enlarged view of part I in FIG. 6.

As shown in FIGS. 6 and 7, a mounting rack 12 for mounting the burner 1 is provided in the furnace 2, wherein the mounting rack 21 has a rectangular structure. Referring to FIGS. 4 and 5, the burner 1 comprises a first sidewall 1001, a second sidewall 1002, a third sidewall 1003, a fourth sidewall 1004, a fifth sidewall 1005, and a sixth sidewall 1006, wherein the feed opening is disposed at the first sidewall 1001; the second sidewall 1002 and the third sidewall 1003 are respectively disposed at two sides of the first sidewall 1001; the fourth sidewall 1004 is connected with the second sidewall 1002; the fifth sidewall 1005 is connected with the third sidewall 1003; the sixth sidewall 1006 is connected with the fourth sidewall 1004 and the fifth sidewall 1005, respectively; and the fourth sidewall 1004, the fifth sidewall 1005, and the sixth sidewall 1006 are parallel to opposite sidewalls of the mounting rack 21, respectively. As such, the space that could not be utilized previously by the cylindrical burner inside the mounting rack 21 in conventional technologies can be utilized sufficiently; with increase of the combustion area of the burner 2, a higher combustion effect is achieved. The mounting rack 21 may also have other shapes, and the sidewalls of the burner 1 may also be adapted to variations of the sidewalls of the mounting rack 21.

Figure 8:
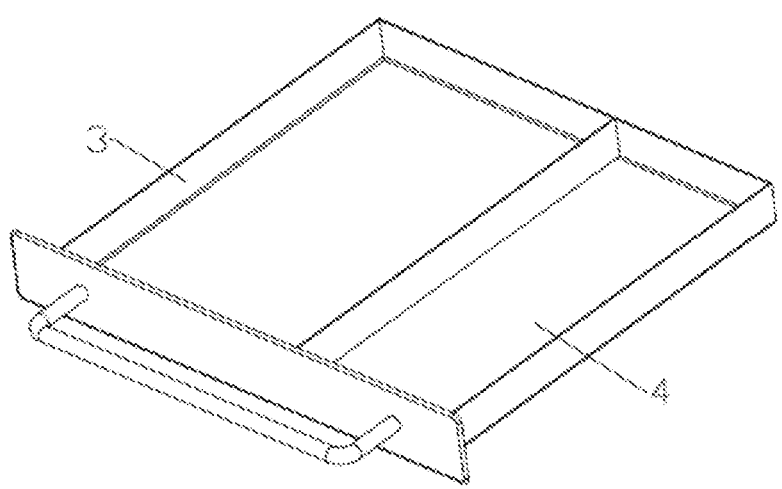
FIG. 8 shows a schematic diagram of an ash tray and a water storage pan in the third embodiment of the present disclosure.

With reference to FIGS. 7 and 8, an ash tray 3 is disposed under the burner 1; the ash tray 3 faces the through port; as the ash constantly drops into the ash tray 3, the user is only required to regularly and timely dump the accumulated ash in the ash tray 3, thereby significantly improving user experience.

Alternatively, the ash tray 3 is arranged side by side with a water storage pan 4. Water in the water storage pan 4 may be used to moisten the ash in the ash tray 3 so as to avoid flying of the ash; as the ash tray 3 is separated from the water storage pan 4 and the ash tray 3 faces the grate, the odds of the ash falling into the water storage pan 4 may be lowered, which guarantees quality of the water in the water storage pan 4. As the pellet fuel produces much heat when being burnt in the burner, the water in the water storage pan 4 is heated to facilitate water evaporation and vaporization; while the burnt pellet fuel ash will be combined with the water vapor during the process of falling into the ash tray 3 via the through port, causing increase of ash weight, such that the ash falls into the ash tray 3 more easily without being blown to fly in the furnace 2, thereby achieving self-clearing; the water vapor may be combined with the carbon molecules generated in the pellet fuel burning process, with CO generated, which promotes combustion; the evaporated water increases humidity inside the furnace 2, such that in cases of barbecue, the humidity also adds moisture to the food, rendering the food more tender and delicious.

Other contents that have not been described in this embodiment may refer to the previous embodiments.

Besides the embodiments above, the present disclosure also has other embodiments. Those skilled in the art may make various variations and alternations based on the present disclosure, and such variations and alterations should fall within the scope defined by the appended claims without departing from the spirit of the present disclosure.

What is claim:
1. A pellet stove, comprising:
   a furnace;
   a burner disposed in the furnace, a top of the burner being open; and
   a feed opening provided at a first sidewall of the burner,
   wherein a through port for air intake and ash falling is provided at an underside of the burner,
   wherein a grate supporting pellet fuel is provided above the through port,
   wherein auxiliary supports for sustaining bottom fire are disposed under the grate, and
   wherein the auxiliary supports are arranged higher than the through port, and the auxiliary supports are located at a side below the feed opening and cover an area not exceeding ½ of the area covered by the grate.
2. The pellet stove according to claim 1,
   wherein the burner comprises a second sidewall and a third sidewall which are respectively disposed at two sides of the first sidewall,
   wherein the second sidewall and the third sidewall are extended into a splayed configuration towards two sides along a feed direction of the feed opening, and
   wherein the auxiliary supports are connected with respective bottoms of the second sidewall and the third sidewall.
3. The pellet stove according to claim 2,
   wherein a mounting rack for mounting the burner is provided in the furnace, the burner further comprises a fourth sidewall connected with the second sidewall, a fifth sidewall connected with the third sidewall, and a sixth sidewall connected with the fourth sidewall and the fifth sidewall, and wherein each of the fourth sidewall, the fifth sidewall, and the sixth sidewall faces and is parallel to a corresponding sidewall of the mounting rack.

4. The pellet stove according to claim 1, wherein the grate comprises a first tier of supports and a second tier of supports, the first tier of supports and the second tier of supports being secured to the burner, wherein the supports in the first tier are disposed lower than the adjacent supports in the second tier, the second tier of supports is staggered with the first tier of supports in the vertical direction, and a first passage for ash falling and air intake is provided between the first tier of supports and the second tier of supports, and wherein a width of the first passage is smaller than a diameter D of the pellet fuel, and a spacing L2 between two adjacent supports in the second tier is greater than D but smaller than 2D.

5. The pellet stove according to claim 4, wherein the first tier of supports and the second tier of supports extend in a direction parallel to a feed direction of the feeding port.

6. The pellet stove according to claim 1, wherein the burner comprises an open bottom that forms the through port.

7. The pellet stove according to claim 1, wherein the auxiliary supports are of a bar structure, a net structure, or a perforated plate-like structure.

8. The pellet stove according to claim 1, wherein the auxiliary supports are removably coupled to the burner.

9. The pellet stove according to claim 1, further comprising an ash tray that is provided under the burner and facing the through port.

10. The pellet stove according to claim 9, further comprising a water storage pan, wherein:

the ash tray is disposed in the water storage pan;
the ash tray is disposed above the water storage pan; or
the water storage pan is provided side by side with the ash tray.

* * * * *